US012783862B2

(12) United States Patent
Chang et al.

(10) Patent No.: US 12,783,862 B2
(45) Date of Patent: Nov. 3, 2026

(54) APPARATUS FOR ENABLING THE CONVERSION AND UTILIZATION OF VARIOUS FORMATS OF NEURAL NETWORK MODELS AND METHOD THEREOF

(71) Applicant: AiM Future Inc., Seoul (KR)

(72) Inventors: Hoseok Chang, Seoul (KR); Namsoon Jung, San Ramon, CA (US)

(73) Assignee: AiM Future Inc., Seoul (KR)

( * ) Notice: Subject to any disclaimer, the term of this patent is extended or adjusted under 35 U.S.C. 154(b) by 947 days.

(21) Appl. No.: 18/148,330

(22) Filed: Dec. 29, 2022

(65) Prior Publication Data

US 2023/0214638 A1 Jul. 6, 2023

Related U.S. Application Data

(60) Provisional application No. 63/295,044, filed on Dec. 30, 2021.

(51) Int. Cl.
*G06N 3/02* (2006.01)
*G06N 3/063* (2023.01)

(52) U.S. Cl.
CPC .................................... *G06N 3/063* (2013.01)

(58) Field of Classification Search
CPC ........................................................ G06N 3/02
See application file for complete search history.

(56) References Cited

U.S. PATENT DOCUMENTS 5,546,503 A * 8/1996 Abe ........................ G06N 3/082 706/25
10,970,633 B1 * 4/2021 Gweon .................. G06N 3/045
11,373,029 B2 * 6/2022 Newton ................. G06N 20/00
2018/0157961 A1 6/2018 Henry et al.
2019/0065974 A1 * 2/2019 Michigami ............ G06N 3/045
2019/0220744 A1 * 7/2019 Yao ....................... G06V 10/776
2019/0340492 A1 * 11/2019 Burger ..................... G06F 17/16
2020/0193274 A1 * 6/2020 Darvish Rouhani .. G06N 3/063
2021/0334622 A1 * 10/2021 Tao ....................... G06N 3/0464
2022/0051099 A1 2/2022 Shazeer et al.
2022/0147333 A1 * 5/2022 Malvankar .............. G06F 40/20
(Continued)

FOREIGN PATENT DOCUMENTS

CN 111753948 A 10/2020
CN 112328674 A 2/2021
CN 114092313 A 2/2022
(Continued)

OTHER PUBLICATIONS

Jin et al., "Compiling ONNX Neural Network Models Using MLIR," arXiv:2008.08272v2 [cs.PL], pp. 1-8, Oct. 1, 2020.
(Continued)

*Primary Examiner* — Jae U Jeon
(74) *Attorney, Agent, or Firm* — Seed Intellectual Property Law Group LLP

(57) ABSTRACT

Disclosed is a method of processing information in an electronic apparatus, the method including acquiring a neural network model, determining a reference format for conversion of the neural network model, and converting the neural network model to a model of the reference format, wherein the model converted into the reference format is executed in a neural processing unit (NPU).

20 Claims, 10 Drawing Sheets

(56) References Cited

U.S. PATENT DOCUMENTS

| | | | | |
|---|---|---|---|---|
| 2022/0245458 | A1 | 8/2022 | Park | |
| 2022/0309320 | A1* | 9/2022 | Trusov | G06N 3/0495 |

FOREIGN PATENT DOCUMENTS

| | | | |
|---|---|---|---|
| KR | 102064642 | B1 | 1/2020 |
| KR | 102180002 | B1 | 11/2020 |
| KR | 102263371 | B1 | 6/2021 |
| KR | 102298766 | B1 | 9/2021 |
| KR | 10-2022-0112066 | A | 8/2022 |

OTHER PUBLICATIONS

Park et al., "Conversion Tools of Spiking Deep Neural Network based on ONNX," The Journal of the Institute of Internet, Broadcasting and Communication (IIBC), vol. 20 Issue 2, pp. 165-170, Apr. 30, 2020.

Ambrosi et al., "Hardware-software co-design for an analog-digital accelerator for machine learning," 2018 IEEE International Conference on Rebooting Computing (ICRC), pp. 1-13, 2018.

Lin et al., "ONNC: A compilation framework connecting ONNX to proprietary deep learning accelerators," IEEE International Conference on Artificial Intelligence Circuits and Systems (AICAS), pp. 214-218, 2019.

* cited by examiner

APPARATUS FOR ENABLING THE CONVERSION AND UTILIZATION OF VARIOUS FORMATS OF NEURAL NETWORK MODELS AND METHOD THEREOF

CROSS-REFERENCE TO RELATED APPLICATION(S)

This application claims the benefit of Provisional Application No. 63/295,044, filed on Dec. 30, 2021, the disclosure of which is incorporated herein by reference.

BACKGROUND

Technical Field

The present disclosure relates to a method and apparatus for enabling the conversion of a neural network model that may be implemented in various formats depending on the deep learning framework. The neural network model may be converted to a specific format that is executed on a neural processing unit (NPU), where the present disclosure also tries to find an optimal neural network performance for the neural network model.

Description of the Related Art

After a neural network model is designed, the neural network model is typically implemented in a deep learning framework. Since there exist multiple different deep learning frameworks that utilize specific neural network formats for each of their own frameworks, the neural network model may be represented in multiple different formats.

In the related field, Open Neural Network Exchange (ONNX) or Neural Network Exchange Format (NNEF) are a few of examples for the exchangeable format of the neural networks that facilitate the conversion among various neural network model formats.

REFERENCES IN THE RELATED ART

Jin, Tian, Gheorghe-Teodor Bercea, Tung D. Le, Tong Chen, Gong Su, Haruki Imai, Yasushi Negishi et al. "Compiling ONNX Neural Network Models Using MLIR." arXiv preprint arXiv:2008.08272 (2020), (hereinafter Jin, et al.)

Lin, Wei-Fen, Der-Yu Tsai, Luba Tang, Cheng-Tao Hsieh, Cheng-Yi Chou, Ping-Hao Chang, and Luis Hsu. "ONNC: A compilation framework connecting ONNX to proprietary deep learning accelerators." In 2019 IEEE International Conference on Artificial Intelligence Circuits and Systems (AICAS), pp. 214-218. IEEE, 2019, (hereinafter Lin, et al.)

Ambrosi, Joao, Aayush Ankit, Rodrigo Antunes, Sal Rahul Chalamalasetti, Soumitra Chatterjee, Izzat El Hajj, Guilherme Fachini et al. "Hardware-software co-design for an analog-digital accelerator for machine learning." In 2018 IEEE International Conference on Rebooting Computing (ICRC), pp. 1-13. IEEE, 2018, (hereinafter J. Ambrosi et al.)

Park, Sangmin; Heo, Junyoung, "Conversion Tools of Spiking Deep Neural Network based on ONNX." In the Journal of the Institute of Internet, Broadcasting and Communication, Volume 20 Issue 2, Pages. 165-170, 2020, (hereinafter Park, et al.)

BRIEF SUMMARY

The present disclosure utilizes a set of conversion tools and optimization techniques in order to convert the neural network model from various pre-conversion formats to a format that can run on a neural processing unit (NPU). In other words, a suitable conversion is required for converting the neural network models that are represented in multiple different formats to the neural network format that can be supported by the hardware such as NPU in the present embodiment. The present disclosure also tries to find an optimal neural network performance for the neural network model that is generated from each pre-converted format.

Jin discusses an example approach of utilizing the ONNX format in order to suggest a compiler that rewrites a trained neural network model to a native code for a specific hardware accelerator. Unlike Jin, et al. the present disclosure is not related to a novel compiler. The present disclosure suggests a higher-level model format conversion approach utilizing various conversion and hardware instruction mapping tools, which include the ONNX format but not limited to, for a scalable and flexible neural processing unit. Accordingly, the present disclosure may include content different from that of Jin, et al.

Lin discusses a compilation framework based on ONNX for a hardware accelerator. Lin, et al. suggests that the direct adaptation of the ONNX into their compiler optimizes the performance of the deep learning accelerator in terms of memory consumption and speed enhancement. Lin, et al. discusses an example approach for translating ONNX-based neural network model format, assuming the neural network models are ready in the ONNX-based format. The present disclosure discusses another view of translating the neural network models where the ONNX-based format may not exist or be optimized for a certain type of neural network models, in which case a separate converter and lowering module of the neural network model to low-level instructions for a hardware accelerator is needed. Accordingly, the present disclosure may include content different from that of Lin, et al.

Ambrosi discusses an application of ONNX as a part of the software stack for a hardware accelerator. J. Ambrosi et al. proposes an approach that directly embeds the ONNX as the backend for importing neural network model. J. Ambrosi et al. relies on the ONNX for the task of adapting to various types of neural network models and does not discuss about other methods of format conversion. The present disclosure proposes a hybrid approach where other neural network model format conversion approaches are intermixed with the ONNX format conversion in order to provide a greater flexibility in the format conversion process. Accordingly, the present disclosure may include content different from that of J. Ambrosi, et al.

Park utilizes ONNX as a tool to efficiently express a spiking deep neural network in the process of converting an existing neural network model into a spiking neural network model. Park, et al. discusses the necessity of transformation process that is caused by the different ways of expressing neural network graphs for each AI framework. When the same neural network model is converted to ONNX using a different framework, the loss in the calculation process is different for each framework. The present disclosure proposes a method for selecting the most efficient framework by analyzing the losses. Accordingly, the present disclosure may include content different from that of Park, et al.

An aspect provides an electronic apparatus for acquiring a neural network model, determining a reference format for conversion of the neural network model, and converting the neural network model to a model of the reference format so that the model converted into the reference format is executed in a neural processing unit (NPU), and a method thereof.

Technical goals to be achieved through the example embodiments are not limited to the technical goals as described above, and other technical tasks can be inferred from the following example embodiments.

According to an aspect, there is provided a method of processing information in an electronic apparatus, the method including acquiring a neural network model, determining a reference format for conversion of the neural network model, and converting the neural network model to a model of the reference format, wherein a model converted into the reference format is executed in an NPU.

When the neural network model includes floating point data, the converting of the neural network model may include quantizing at least a portion of data included in the neural network model based on a set Q-number.

The method may further include determining, for each of a plurality of candidate Q-numbers, a precision of the conversion of a case in which each candidate Q-number is used and determining the Q-number based on a determination result of the precision.

The determining of the precision of the conversion may include identifying a mean squared error (MSE) of the case in which each candidate Q-number is used.

The determining of the precision of the conversion may include acquiring a test neural network model and identifying a precision of the conversion for the test neural network model.

The acquiring of the test neural network model may include acquiring a model that satisfies at least one of a first condition of having a smaller number of nodes for each layer compared to the neural network model, a second condition of having a smaller weight for each node of a layer compared to the neural network model, and a third condition of having a smaller number of items of input and output data required for execution compared to the neural network model.

The method may further include determining a quantity of input data for executing the model converted into the reference format in the NPU.

The determining of the quantity of input data may include determining a quantity of input data that reduces or minimizes a calculation iteration of the NPU.

When a plurality of NPUs is used for executing the model converted into the reference format, the determining of the quantity of input data may include determining, for each of the plurality of NPUs, a number of items of data to be processed through one calculation, determining a number of items of input data allocated for each of the plurality of NPUs, identifying an NPU in which a ratio of the number of items of allocated input data to the number of items of data to be processed is increased or maximized among the plurality of NPUs, and determining, for the identified NPU, a quantity of input data that reduces or minimizes a calculation iteration.

The determining of the reference format may include identifying a format executable in the NPU.

When a plurality of formats is executable in the NPU, the method may further include identifying, for each of the plurality of formats, an inference result obtained in the NPU in a case in which the neural network model is converted using each format and determining the reference format based on the inference result.

The converting of the neural network model may include determining whether the neural network model is to be directly converted to the model of the reference format, directly converting the neural network model to the model of the reference format when the neural network model is to be directly converted to the model of the reference format, and converting the neural network model to a model of an intermediate format when the neural network model is not to be directly converted to the model of the reference format.

The intermediate format may include a YAML format.

According to another aspect, there is also provided an electronic apparatus for processing information, the electronic apparatus including a memory in which an instruction is stored and a processor, wherein the processor is connected to the memory and configured to acquire a neural network model, determine a reference format for conversion of the neural network model, and convert the neural network model to a model of the reference format and the model converted into the reference format is executed in an NPU.

Details of example embodiments are included in the detailed description and drawings.

According to an example embodiment, an electronic apparatus for processing information and a method thereof may convert a neural network model so that the neural network model is executed in an NPU.

Further, according to an example embodiment, an electronic apparatus for processing information and a method thereof may allow a neural network model to secure an optimal neural network performance.

Effects are not limited to the aforementioned effects, and other effects not mentioned will be clearly understood by those skilled in the art from the description of the claims.

DETAILED DESCRIPTION

Figure 1:
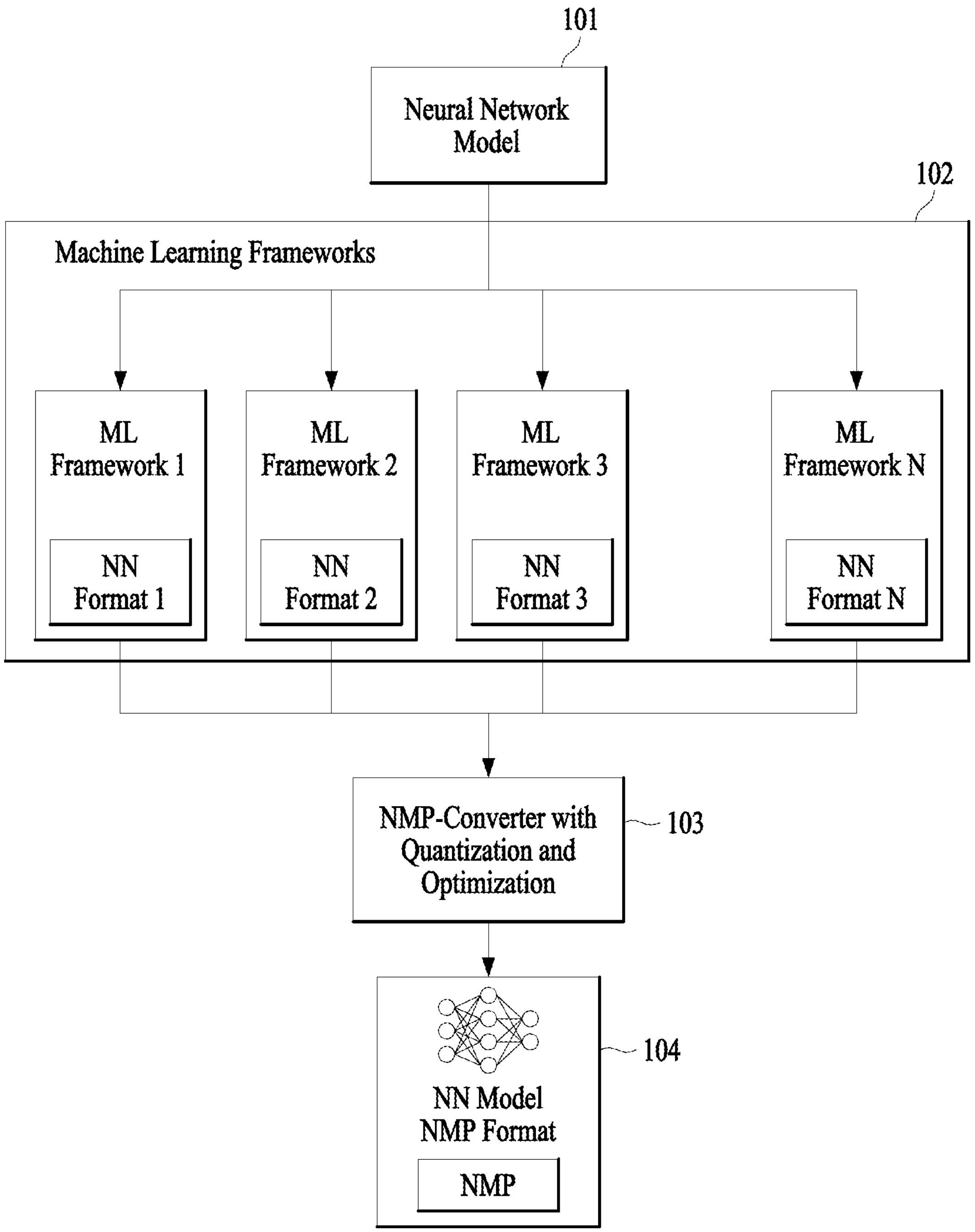
FIG. 1 describes a high-level view of the present disclosure.

The terms used in the embodiments are selected, as much as possible, from general terms that are widely used at present while taking into consideration the functions obtained in accordance with the present disclosure, but these terms may be replaced by other terms based on intentions of those skilled in the art, customs, emergence of new technologies, or the like. Also, in a particular case, terms that are arbitrarily selected by the applicant of the present disclosure may be used. In this case, the meanings of these terms may be described in corresponding description parts of the disclosure. Accordingly, it should be noted that the terms used herein should be construed based on practical meanings thereof and the whole content of this specification, rather than being simply construed based on names of the terms.

In the entire specification, when an element is referred to as "including" another element, the element should not be understood as excluding other elements so long as there is no special conflicting description, and the element may include at least one other element. In addition, the terms "unit" and "module", for example, may refer to a component that exerts at least one function or operation, and may be realized in hardware or software, or may be realized by combination of hardware and software.

The expression "at least one of A, B, and C" may include the following meaning: A alone; B alone; C alone; both A and B together; both A and C together; both B and C together; or all three of A, B, and C together.

The expression "A and/or B" includes the following meaning: A alone; B alone; or both A and B together.

In the present disclosure, a "terminal" may be implemented as a computer or a portable terminal capable of accessing a server or another terminal through a network. Here, the computer may include, for example, a laptop computer, a desktop computer, and a notebook equipped with a web browser. The portable terminal may be a wireless communication device ensuring a portability and a mobility, and include any type of handheld wireless communication device, for example, a tablet PC, a smartphone, a communication-based terminal such as international mobile telecommunication (IMT), code division multiple access (CDMA), W-code division multiple access (W-CDMA), and long term evolution (LTE).

In the following description, example embodiments of the present disclosure will be described in detail with reference to the drawings so that those skilled in the art can easily carry out the present disclosure. The present disclosure may be embodied in many different forms and is not limited to the embodiments described herein.

Hereinafter, example embodiments of the present disclosure will be described with reference to the drawings.

In describing the example embodiments, descriptions of technical contents that are well-known in the art to which the present disclosure belongs and are not directly related to the present specification will be omitted. This is to more clearly communicate without obscuring the subject matter of the present specification by omitting unnecessary description.

For the same reason, in the accompanying drawings, some components are exaggerated, omitted or schematically illustrated. In addition, the size of each component does not fully reflect the actual size. The same or corresponding components in each drawing are given the same reference numerals.

Advantages and features of the present disclosure and methods of achieving them will be apparent from the following example embodiments that will be described in more detail with reference to the accompanying drawings. It should be noted, however, that the present disclosure is not limited to the following example embodiments, and may be implemented in various forms. Accordingly, the example embodiments are provided only to disclose the present disclosure and let those skilled in the art know the category of the present disclosure. In the drawings, embodiments of the present disclosure are not limited to the specific examples provided herein and are exaggerated for clarity. The same reference numerals or the same reference designators denote the same elements throughout the specification.

At this point, it will be understood that each block of the flowchart illustrations and combinations of flowchart illustrations may be performed by computer program instructions. Since these computer program instructions may be mounted on a processor of a general purpose computer, special purpose computer, or other programmable data processing equipment, those instructions executed through the computer or the processor of other programmable data processing equipment may create a means to perform the functions be described in flowchart block(s). These computer program instructions may be stored in a computer usable or computer readable memory that can be directed to a computer or other programmable data processing equipment to implement functionality in a particular manner, and thus the computer usable or computer readable memory. It is also possible for the instructions stored in the computer usable or computer readable memory to produce an article of manufacture containing instruction means for performing the functions described in the flowchart block(s). Computer program instructions may also be mounted on a computer or other programmable data processing equipment, such that a series of operating steps may be performed on the computer or other programmable data processing equipment to create a computer-implemented process to create a computer or other programmable data. Instructions for performing the processing equipment may also provide steps for performing the functions described in the flowchart block(s).

In addition, each block may represent a portion of a module, segment, or code that includes one or more executable instructions for executing a specified logical function(s). It should also be noted that in some alternative implementations, the functions noted in the blocks may occur out of order. For example, the two blocks shown in succession may in fact be executed substantially concurrently, or the blocks may sometimes be executed in the reverse order, depending on the corresponding function.

FIG. 1 describes a high-level view of the present disclosure.

Machine learning (ML) comprises a statistical approach where a graph structure with layers and nodes is designed, and the weights and biases of the nodes in the graph structure are trained over a large set of training data in order to make inference decisions.

After a neural network (NN) model is designed, the neural network model may typically be implemented in a deep learning framework before the neural network is trained based on the training data. Since there exist multiple different deep learning frameworks that utilize specific neural network formats for each of their own frameworks, the neural network model 101 may be represented in multiple different formats as shown in FIG. 1, item 102.

The present disclosure utilizes a set of conversion tools and optimization techniques in order to convert the neural network model from various pre-conversion formats to a format that can run on a neural processing unit (NPU). The set of conversion tools parses the neural network graph and creates an intermediate representation that can be serialized and processed in the later lower-level neural processing unit. In an example embodiment, a YAML type of markup language file can be used in order to store the intermediate representation of the neural network.

In some embodiments, the term "unit" may include any electrical circuitry, features, components, an assembly of electronic components or the like. That is, "unit" may include any processor-based or microprocessor-based system including systems using microcontrollers, integrated circuit, chip, microchip, reduced instruction set computers (RISC), application specific integrated circuits (ASICs), field-programmable gate arrays (FPGAs), graphical processing units (GPUs), logic circuits, and any other circuit or processor capable of executing the various operations and functions described herein. The above examples are examples only, and are thus not intended to limit in any way the definition or meaning of the term "unit."

In some embodiments, the various units described herein may be included in or otherwise implemented by processing circuitry such as a microprocessor, microcontroller, or the like.

The present disclosure also tries to find an optimal neural network performance for the neural network model. The neural network model can exist in any of the pre-converted formats depending on the deep learning framework. Quantization is one of the attempts for producing an optimal performance of the neural network in terms of reducing the processing speed by making the parameter data size small. For example, quantization comprises a process for converting floating-point data to fixed-point data, and mapping the variable decimal point values in floating-point data to a set of discrete finite values. The quantized data may lose some precision, but the size of the quantized data is usually smaller, which makes the size of the entire set of parameters smaller and consume less memory space. The consumption of less memory space may reduce the number of load and store iterations in the hardware units, e.g., iterations between a system memory space and memory blobs in a neural processing unit (NPU), since the number of partitioned data blobs can be made less. This also helps to reduce the sum of calculation and processing time since the network size with the set of quantized parameter data is small, and the computational time and latency for processing fixed-point arithmetic is generally less than that of floating-point arithmetic in the hardware.

As such, for a computation in an NMP 104, conversion, quantization, and optimization of an NN format may be performed using an NMP-converter 103 with quantization and optimization.

An example of overall contents of the present disclosure may include at least a portion of a process of converting various types of neural network models, mapping the neural network models to assembly-level instructions, mapping the assembly-level instructions to an NPU, processing input data by performing, on each inner layer, a process of multiplying a hyper-parameter set by an input data vector using the assembly-level instructions and adding another bias set to a multiplication result, and inferring an outcome based on a probabilistic result generated from addition and multiplication results.

Figure 2:
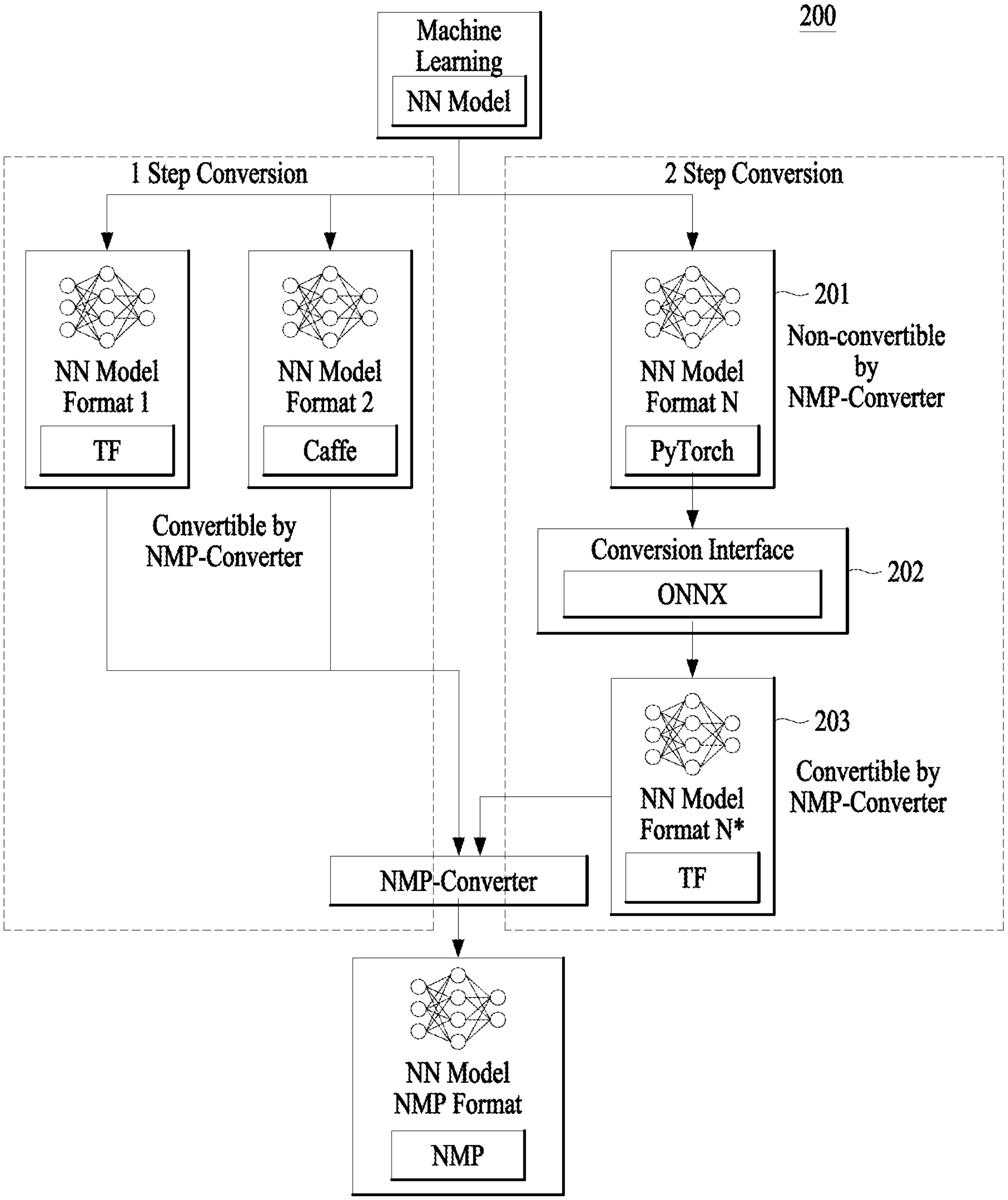
FIG. 2 describes an approach where a set of neuromorphic processor (NMP) conversion and mapping tools is used in order to produce a NMP format and final executable that can run on a neural processing unit (NPU), where the ONNX-based conversion tool is used as a complimentary tool in order to convert any non-NMP-convertible format to a NMP-convertible format.
Figure 3:
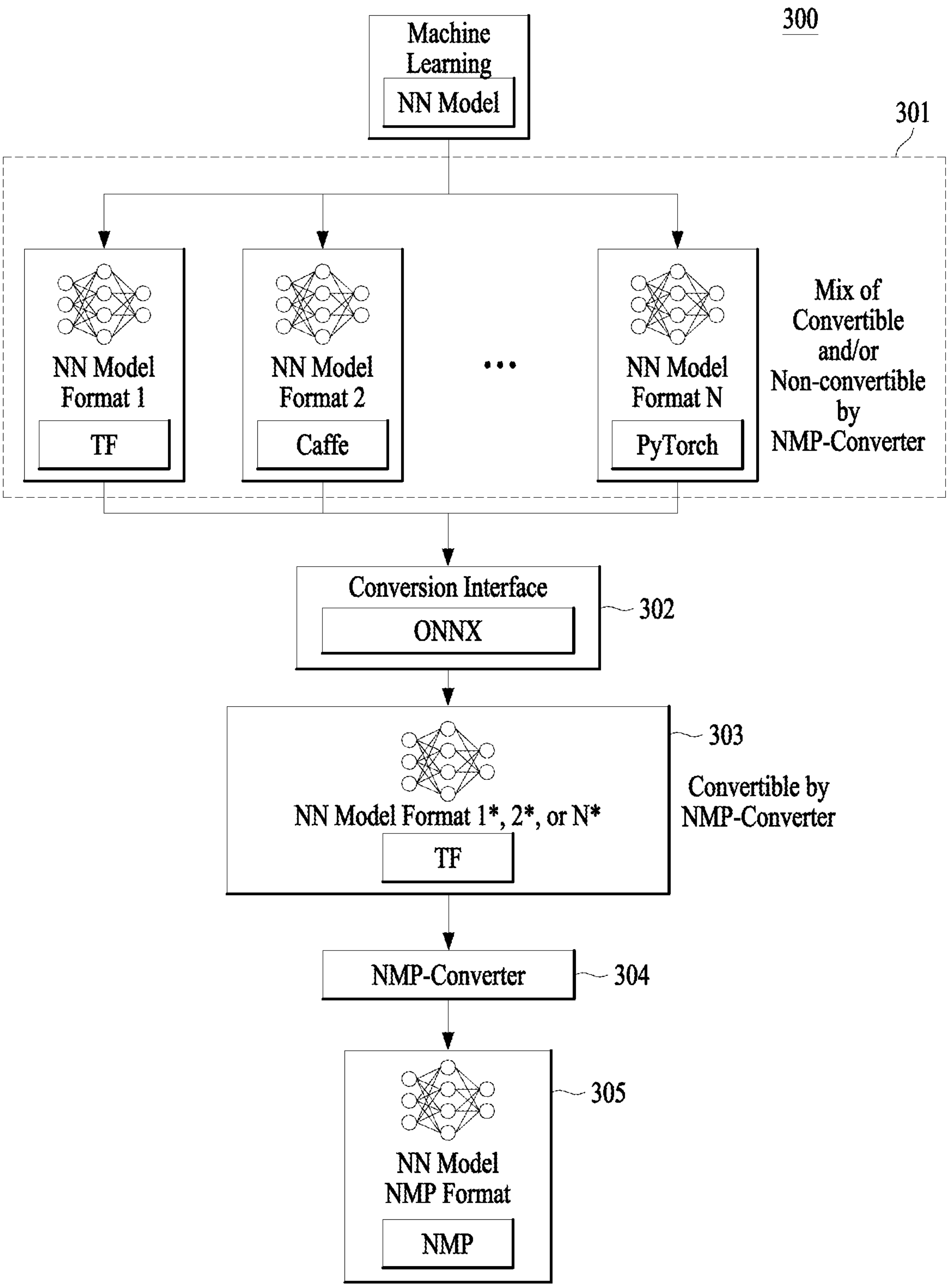
FIG. 3 describes an approach for converting various neural network formats, which comprise 'NMP-convertible format' data and/or 'non-NMP-convertible format' data, into an intermediate 'NMP-convertible format' data, based on the utilization of the ONNX conversion tool, as the 2-step conversion process.
Figure 4:
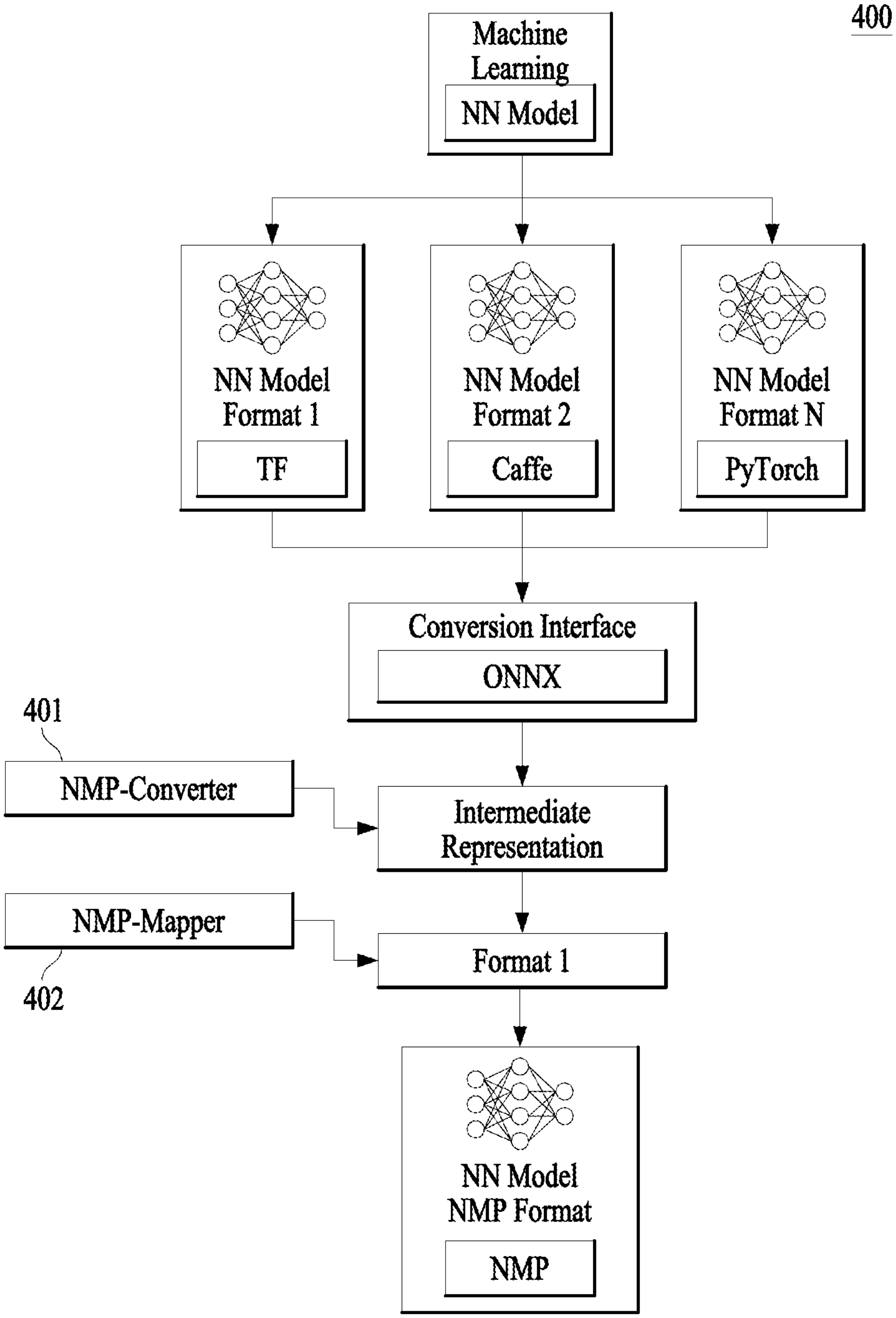
FIG. 4 describes an approach where various neural network formats are converted into an ONNX format-based intermediate representation, and then the intermediate representation is converted into a NMP-supported format and final executable that can run on a neural processing unit (NPU).

FIGS. 2 through 4 describe different approaches of how the conversion process can be applied in the present disclosure. For example, FIG. 2 describes an approach where a set of neuromorphic processor (NMP) conversion and mapping tools is used in order to produce a NMP format and final executable that can run on a neural processing unit (NPU), where the ONNX-based conversion tool is used as a complimentary tool in order to convert any non-NMP-convertible format to a NMP-convertible format that can finally be converted into the NMP format. In addition, ONNX may include a tool for converting an individual neural network framework into an NMP-convertible format.

First, a set of terminologies for the neural network formats that are used in the present disclosure needs to be defined for clarification, as follows:

'NMP format': a neural network data format that can run on the neuromorphic processor (NMP) hardware accelerator 'NMP-convertible format': a neural network data format that is convertible to the NMP format by the NMP-converter 'non-NMP-convertible format': a neural network data format that is not directly convertible to the NMP format by the NMP-converter 'Pre-NMP format': a neural network data format before it is converted to the NMP format, regardless of whether it is directly convertible to the NMP format or not by the NMP-converter After a neural network model is designed, the neural network model can be implemented using a variety of deep learning framework. For example, TensorFlow, Caffe, Sonnet or PyTorch are a few of the frequently utilized deep learning frameworks nowadays. Each of these deep learning frameworks produces output whose data format is specific to each of the deep learning framework. For example, the TensorFlow produces the model output that can be saved in a HDF5 file with '.h5' extension, the TensorFlow Lite model is saved in a FlatBuffer format with '.tflite' file extension, the Caffe model is saved in a file with '.caffemodel' file extension, and the PyTorch model is typically stored in a file with '.pt' or '.pth' file extension. A set of conversion tools (for example, NMP-Converter) and mapping tools (for example, NMP-Mapper, Adapter) can be used in order to convert the deep learning framework-specific data format, e.g., as a form of 'Pre-NMP format,' to a NMP format and map the NMP format to lower-level machine instructions if such a set of conversion and mapping software tool is available. In this example in FIG. 2, the output of the TensorFlow and Caffe is convertible by the NMP-converter and mapper, and it is directly processed by the NMP-converter and mapper in order to produce the neural network data with the 'NMP format,' e.g., a file with '.nmp' extension, as the 1-step conversion process.

For ease of understanding, in FIG. 2, TensorFlow (TF) and Caffe are described as an example of an NMP convertible format and PyTorch are described as an example of an NMP unconvertible format. However, the present disclosure is not limited to the examples. Meanwhile, the NMP format described as the TF in the example embodiments overall may be TFLite.

According to example embodiments, a 1-step conversion process and a 2-step conversion process may be automatically determined and performed for a full neural network model or each neural network framework constituting the full neural network model.

The full neural network model may include: A) a single neural network model format (file); and may also include B) a combination of a plurality of neural network model formats (files). In a case of "A)", in example embodiments, one of the 1-step conversion process and the 2-step conversion process may be selected. In a case of "B)", in example embodiments, one of the 1-step conversion process and the 2-step conversion process may be selected for each neural network model format (file).

Regarding an example embodiment of FIG. 2, as is shown in reference numeral 200, if a direct method of converting and mapping does not exist for a specific pre-NMP format, e.g., PyTorch output data format 201 as an example of the 'non-NMP-convertible format' in this example, an ONNX-based conversion tool 202 can be used in order to convert the 'non-NMP-convertible format' to a 'NMP-convertible format,' e.g., TensorFlow data format 203, in this example embodiment. The intermediate format is eventually converted to the NMP format that runs on the NMP hardware accelerator. This is a 2-step conversion process.

After both types of 'Pre-NMP format' data are finally converted to the 'NMP format' data, the NMP format enables the final executables run on a neural processing unit (NPU), e.g., NMP in this example.

FIG. 3 describes an approach for converting data of various neural network formats 301, which comprise 'NMP-convertible format' data and/or 'non-NMP-convertible format' data, into an intermediate 'NMP-convertible format' data 303, based on the utilization of the ONNX conversion tool 302, as is shown in reference numeral 300. The intermediate 'NMP-convertible format' data 303 is eventually converted to the final NMP format data 305, based on the utilization of a set of conversion and mapping tool (e.g., NMP-Converter 304 of FIG. 3) in the present disclosure. This is one of some example embodiments (e.g., 2-step conversion process), in which any 'Pre-NMP format' neural network data is first converted to the intermediate 'NMP-convertible format' data 303, then to the 'NMP format' data 305 later.

The two steps in the '2-step conversion process' are summarized as follows:

1) First step: convert data of various neural network formats 301, which can exist as a 'NMP-convertible format' or a 'non-NMP-convertible format,' into an intermediate 'NMP-convertible format' data 303 (intermediate representation)
2) Second step: convert the intermediate 'NMP-convertible format' data 303 into the 'NMP format' data 305 (conversion and mapping)

For the first step, the ONNX-based conversion tool 302 is used.

For the second step, a set of NMP conversion and mapping tools that are specifically designed and developed for the NMP hardware accelerator is used over the intermediate 'NMP-convertible format.'

Although the first 'NMP-convertible format' can be directly converted to the NMP format, the second intermediate 'NMP-convertible format' is sometimes beneficial for various reasons. For example, if the detailed neural network model structure needs to be verified in the form of the second intermediate 'NMP-convertible format,' particularly for optimization purpose, it is useful to have the intermediate format. The intermediate format data is eventually converted to the NMP format data in order to produce a final binary executable that can run on a neural processing unit (NPU).

Meanwhile, in the example embodiments, the descriptions are made based on a case in which all the neural network models are converted into TensorFlow data. However, it is merely an example, and the present disclosure is not limited to the example. A model to be converted may vary based on a configuration of an NPU.

FIG. 4 describes an approach where various neural network formats are converted into an ONNX format-based intermediate representation, and then the intermediate representation is converted into a NMP format and final executable that can run on a neural processing unit (NPU), as is shown in reference numeral 400. The present disclosure may utilize an interface with the NMP-converter in order to align the intermediate representation with the specifications of the NMP format requirement. The adapter is a software module that is designed in such a way that the lowered machine instructions by the adapter are based on the available intrinsic function calls of the NMP hardware accelerator. Extending the usage of the adapter further, various hybrid approaches are possible, where a set of NMP conversion and mapping tools can also be used in association with the ONNX format-based intermediate representation, and then the intermediate representation may be adapted into a NMP format.

Intermediate representation may be a data format obtained by converting neural network model file(s), which are generated/output by an interface (conversion interface, for example, ONNX), to the NMP Format by the NMP-converter.

The adapter may convert a configuration of the intermediate representation into the NMP Format such that the configuration includes a machine instruction to be applied to an assembly.

The NMP-converter 304 of FIG. 3 may include the NMP-converter 401 and the NMP-mapper 402 of FIG. 4.

Figure 5:
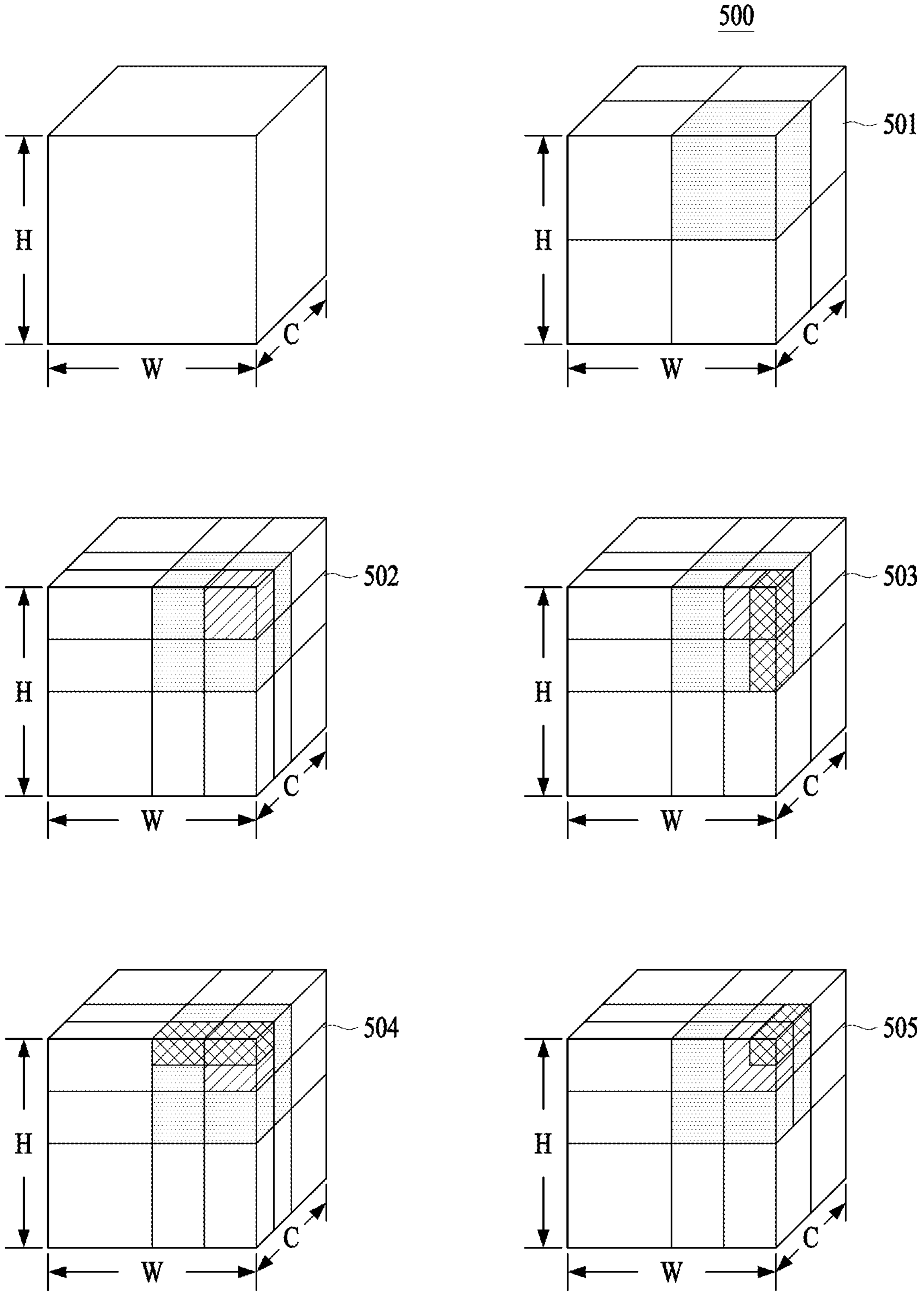
FIG. 5 describes an approach for calculating the optimal size of the input data to reduce or minimize the calculations in the neural network layers in consideration of the number of NPUs.

FIG. 5 describes an approach for calculating the optimal size of the input data to reduce or minimize the calculations in the neural network layers in consideration of the number of NPUs, as is shown in reference numeral 500. A portion or all of the operations of FIG. 5 may be performed in the NMP-converter 103 of FIG. 1.

In the example embodiment, the present disclosure may divide the input data in consideration of the number of NPUs, then select the size of data that can be processed at once in each NPU. The present disclosure may process each layer of the converted model in an order, using each of the NPUs. The input data may be divided into multiple segments, and the segments may be assigned to the NPUs. The next step is to find the NPU that processes the largest number of input data segments. Then, the present disclosure may determine the input data size that reduces or minimizes the calculation iterations of this NPU, by changing the size of the input data segments. When a data processing rate is different for each NPU, instead of reducing or minimizing a calculation iteration of an NPU processing a largest number of input data segments, an NPU that requires a largest amount of time for processing data transferred from one layer or one sequence in a neural network in practice may be determined and a quantity of input data that reduces or minimizes a processing time of the corresponding NPU may be determined. (This is because, when data processing rates of other NPUs are less than the data processing rate of the NPU processing the largest number of input data segments, a larger amount of data processing time may be required although a fewer number of input data segments are processed.)

That is, according to the example embodiments, it is possible to flexibly optimize a processing rate of an NPU based on a structure of learning data and a structure of a neural network model by setting a size of a unit of input data segments allocated to the NPU to reduce or minimize a processing time of the NPU. Meanwhile, in the example embodiments, when setting the size of input data segments, a memory size of the NPU and the number of NPUs to be parallel-processed simultaneously may be taken into consideration.

According to an example embodiment, the present disclosure utilizes the Quad Tree method in order to find a way to efficiently partition the input data, as described below:

When the input shape is W×H×C,

1) Assuming that the number of data that can be processed by the NPU at one time is M and the number of input data allocated to this NPU is N, the number of data processing times NP of this NPU is:

$$NP=\text{upper}(N/M) \quad (1)$$

2) When dividing input data and allocating it to each NPU, the number of processing times of the NPU that processes the most number of times is defined as P.
3) When the shape of the data allocated to one NPU is W×H×C, the input data is divided into a plurality of data segments by dividing size of each dimension (e.g. W/2×H×C, W/2×H/2×C/2), calculating the W', H', C', as is shown in reference numeral 501. The input data is divided in units of W'×H'×C', and allocated to each NPU and calculate the P in step 2. An example of a method in which input data is divided once is as follows.

$$W' \times H' \times C' = W/2 \times H/2 \times C/2 \quad (2)$$

4) Divide W', H', C' of the step 2 by ½, and calculate P2 in the same way as the equation (2) in the step 3), as is shown in reference numeral 502.
5) Repeat steps 3 and 4 in order to divide the input data into the smallest unit that satisfies the condition P>P2.
6) In terms of P of a smallest unit satisfying "P>P2", W is determined in a range between W(P) and W(P2), H is determined in a range between H(P) and H(P2), and C is determined in a range between C(P) and C(P2) (W(P) denotes a value of W corresponding to a value of P, W(P2) denotes a value of W' corresponding to a value of P2, and H and C may also be understood in a likewise manner), as is shown in reference numerals 503, 504 and 505.

Figure 6:
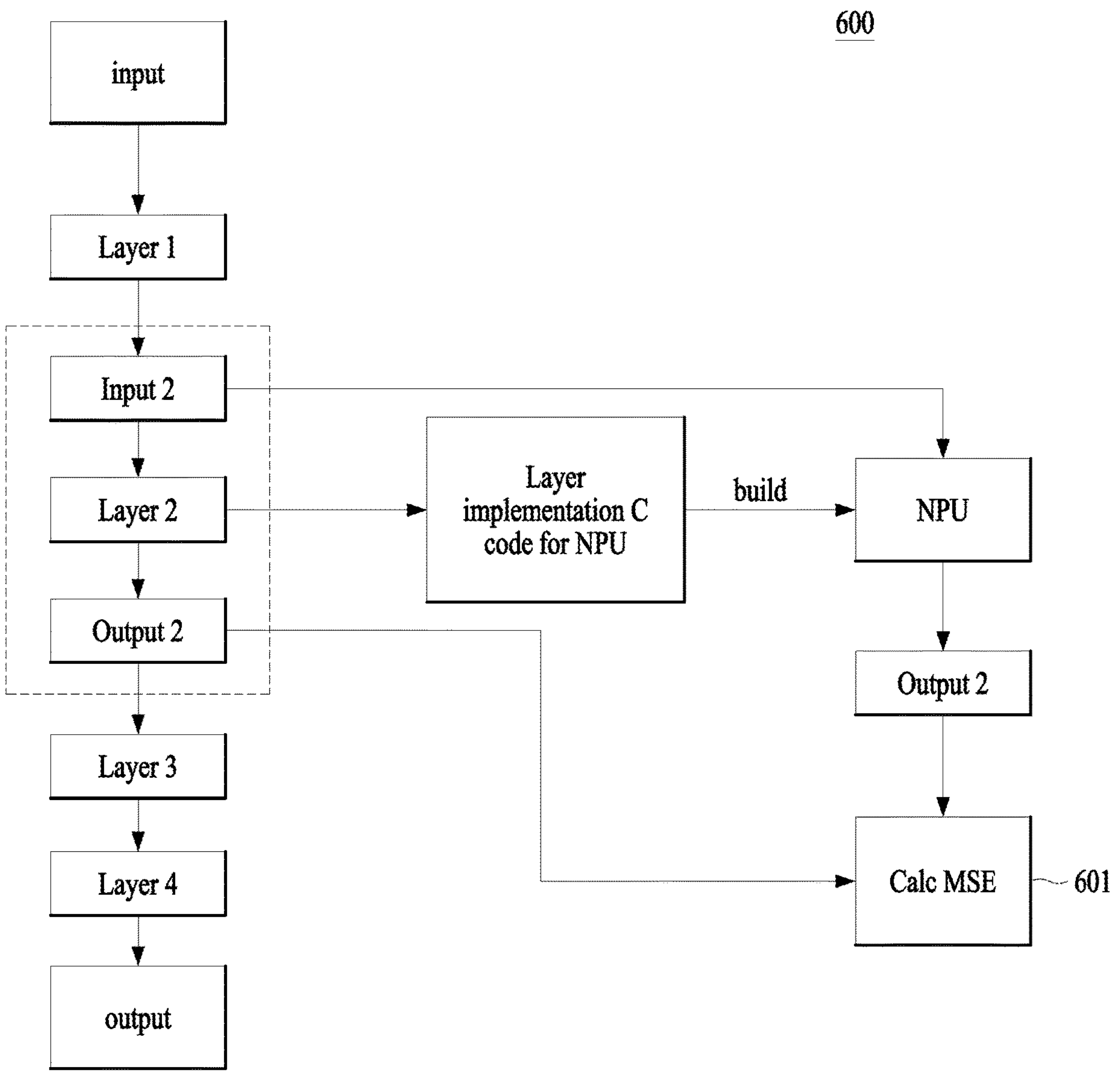
FIG. 6 describes an approach for designing a small test NN (Neural Network) model in order to find the optimal Q-Value (or Q number) for the quantization by comparing the inference results between the NPU and the ML Framework.

FIG. 6 describes an approach for designing a small test NN model in order to find the optimal Q-Value (or Q number) for the quantization by comparing the inference results between the NPU and the ML Framework, as is shown in reference numeral 600.

An operation of FIG. 6 may be used as one method to perform a quantization in the NPU converter 103 of FIG. 1.

When the NPU is not designed to support floating point data, such as 32 bit floating point data, a quantization may be performed in order to change floating point input values to values expressed in Q-Format (for example, to change the 32 bit floating point input values to values expressed in 16-bit Q-Format). The Q-Format is an example of succinct way to specify the parameters of a fixed point number format. To perform quantization, it is beneficial to find an optimal Q-Value for each layer parameter, and this Q-Value is used by the NPU for inference. The implementation method is different for each type of neural network layer in ML Framework and NPU. Therefore, while changing the Q-Value, the error of the output result from the ML Framework and the NPU for the same input is compared, and the optimal Q-Value with the smallest error needs to be determined.

Meanwhile, in the present disclosure, the term "Q-Value" and the term "Q-number" may be understood as concepts corresponding to each other, and when both terms are used interchangeably, the terms may be understood as having the same meaning.

In the present disclosure, an example process of determining the optimal Q-value is as follows:

1) For a certain layer, the output data obtained by calculating the input data without quantizing the parameters of the layer is obtained.
2) Find the maximum and minimum values of the parameter values of the corresponding layer and calculate the appropriate Q-Value.
3) Quantize the parameters of the layer at the step 1, using the Q-Value determined in the step 2, and make a small test NN model composed of this layer. Then, this model is converted to a format that works on the NMP. The same input as in the step 1 is entered into the NMP, and an output of the model is produced.
4) Measure the degree of error between the output at the step 1 and at the step 3, using an error measurement function such as the mean squared error (MSE), as shown in reference numeral 601.
5) Increase or reduce the Q value by one (for example, +−1) in the step 2, perform a process of the step 3 again, measure an error between output data newly obtained by performing the step 3 and the output data obtained in the step 1 (that is, perform the step 4 again), and compare the measured error to an error obtained when the preceding (that is, immediately previous to the most recent operation of changing the Q value) Q value is used. When the error increases, the iteration of steps 2 through 4 may terminate. When the error is reduced or maintained, the step 5 may be performed again to change the Q value.
6) Determine the Optimal Q-Value with the smallest degree of error and quantize the corresponding layer based on the determined optimal Q-Value.

When the target data has a different characteristic, the accuracy may be changed based on a conversion scheme of floating point data. Through such comparison of FIG. 6, an optimal Q value for computation of the target data to be processed may be determined. By determining the optimal Q value, an operation of the NMP-Converter with quantization and optimization may be optimized, so that an operation is performed in the NPU with increased efficiency.

Figure 7:
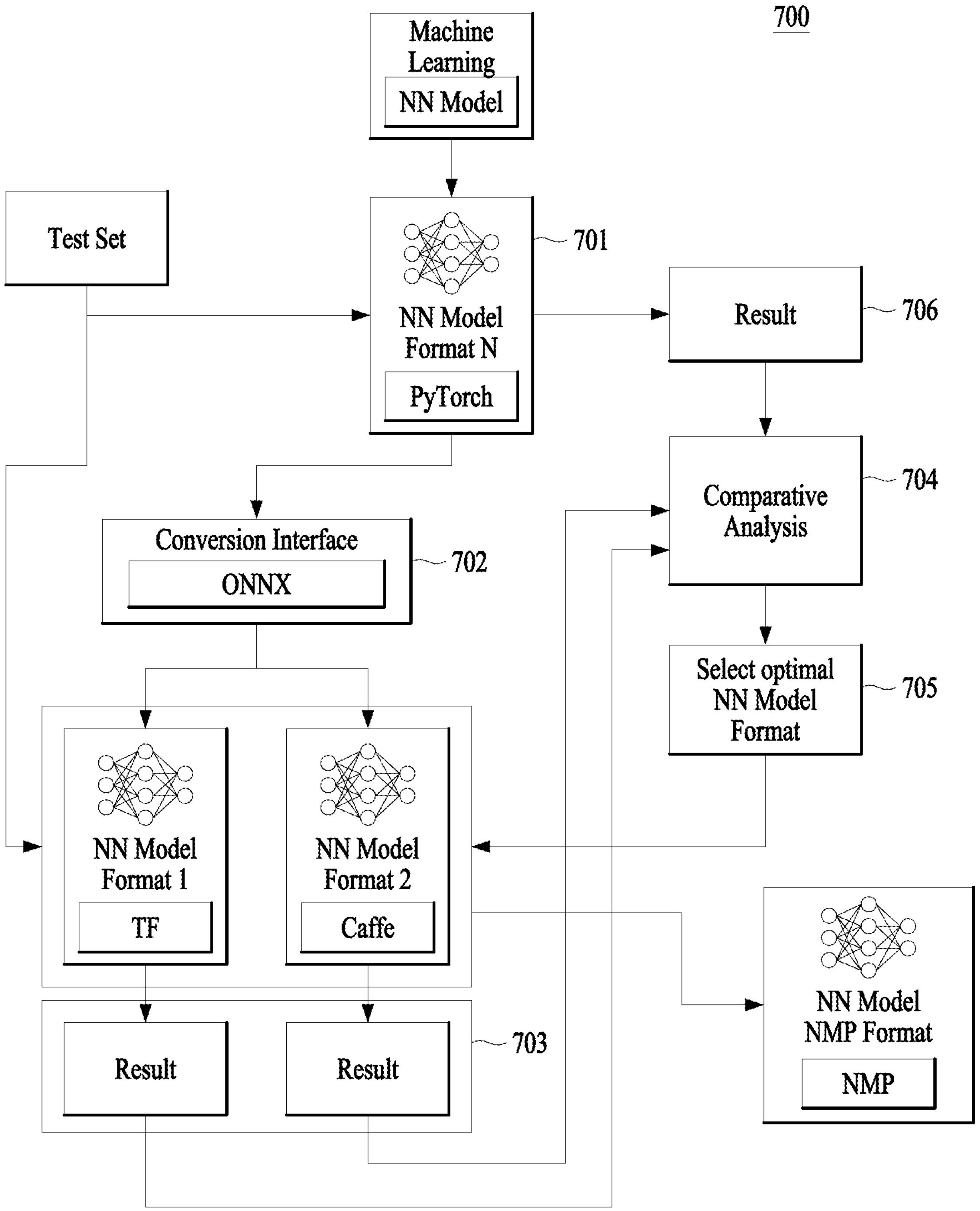
FIG. 7 describes an approach for finding the optimal NN model format by comparing the inference results using the same test set when the test set is inferred by the NN model in its original data format and the NN Model that is converted from a PyTorch data format to TensorFlow data format and/or Caffe data format through the ONNX.

FIG. 7 describes an approach for finding the optimal NN model format by comparing the inference results using the same test set when the test set is inferred by the NN model in its original data format and the NN Model that is converted from a PyTorch data format to TensorFlow data format and/or Caffe data format through the ONNX, as is shown in reference numeral 700.

For the same input data, the accuracy of the inference result may be different depending on how the 'NMP-convertible format' is constructed. Therefore, a neural network model with a 'non-NMP-convertible format' may be converted to an ONNX formatted data, then the ONNX formatted data may be converted into several types of 'NMP-convertible format' data for the neural network model. For the same input data, the inference result from using the 'non-NMP-convertible format' may be compared with the inference result from using each of the several types of 'NMP-convertible format' data. Then, the 'NMP-convertible format' with the least error may be selected, and the selected data may be eventually converted into the "NMP Format." Finding an 'NMP-convertible format' with less error requires additional computation processes. However, it is executed once in the preparation stage before running the NN model in the NMP (NPU). On the other hand, the final "NMP Format," created using the optimal 'NMP-convertible format,' may be iteratively utilized in the inference stage using the NMP.

In addition, in FIG. 7, results may indicate different types of NMP-convertible data formats (for example, Tensorflow format, Caffe format, etc.) output through a conversion of the neural network model by the conversion interface. A data format identified as having an optimal operation processing capability may be selected by comparing the results with neural network model formats that have not been converted yet.

The detailed steps of an example process are as follows:

1) Prepare NN model in raw format, which is one of 'non-NMP-convertible format' (e.g. PyTorch format 701).
2) Convert the NN model in Step1 to ONNX format 702. Generate results 703 (e.g. TensorFlow format, Caffe format . . . ) by converting the neural network model into various NMP-convertible formats.
3) Using the same input data set, the NN model of raw format and the NN models of the result formats are used to obtain each inference results and calculate the mean squared error (according to embodiments, other error measurement function may be applied) between the results 703 and 706. Compare processing rates and accuracies from the inference results between the NN model of the result format and the NN model of the raw format, as is shown in reference numeral 704.
4) Select the optimal 'NMP-convertible format' with less error among Step3, as is shown in reference numeral 705. The comparison of the error may be performed by comparing result values. Through such comparison, a result value obtained by using the raw format such as PyTorch and result values derived by using TF and Caffe may be compared so as to select a format with better performance. In addition, through this, an optimal conversion format may be determined based on a computational situation, and an operation may be performed in the NMP through the conversion into the selected format. In the example embodiments, although the description is made based on TF and Caffe as an example, the present disclosure is not limited to the example. When a plurality of formats is available in the NMP, result values for the formats may be compared to result values obtained when formats before the conversion are used, so that the conversion is performed using a format with better performance.

Figure 8:
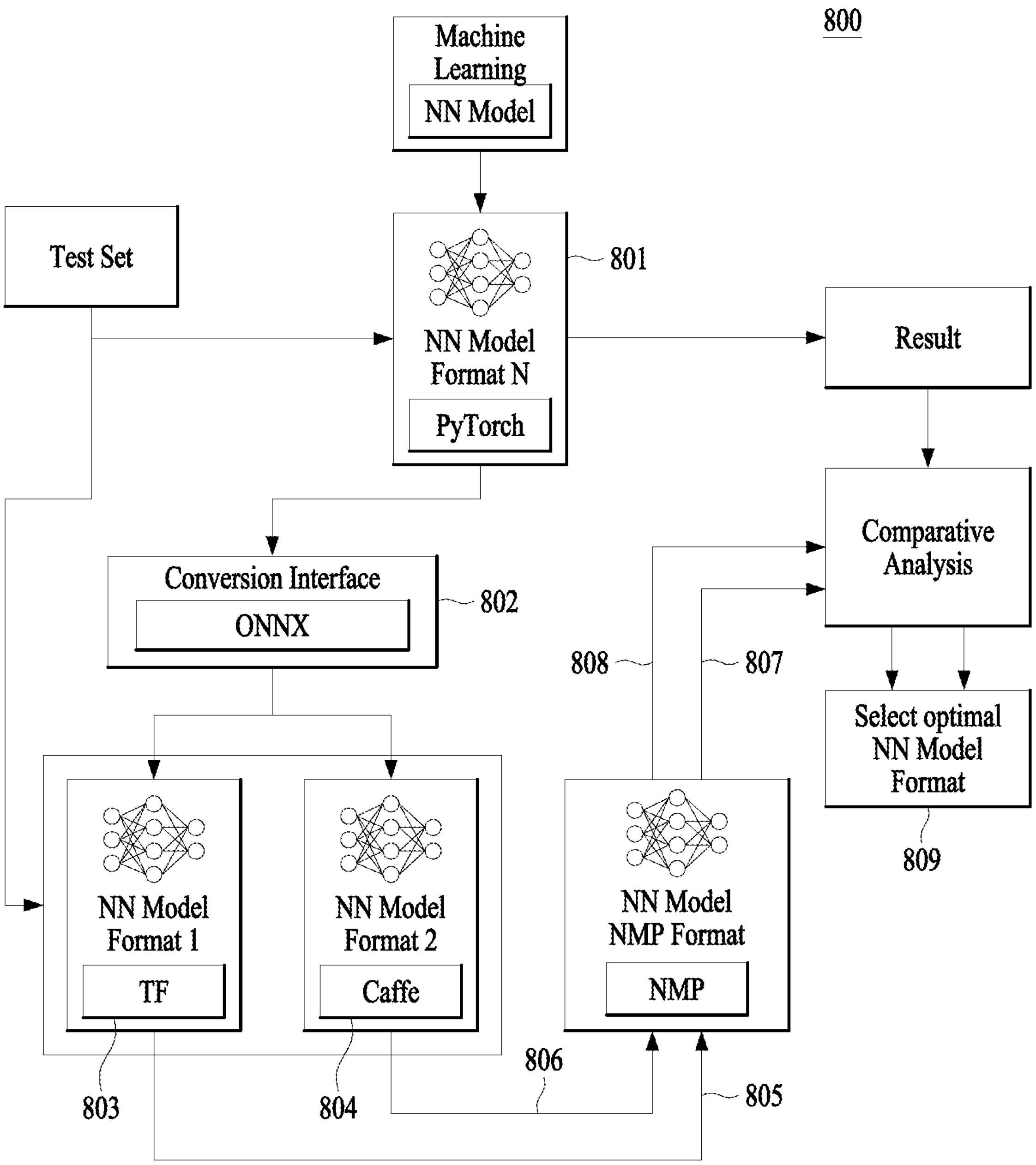
FIG. 8 describes an approach for finding the optimal NN model format by comparing the inference results using the same test set when the test set is inferred by the NN model in its original data format and the NN Model that is converted from a PyTorch data format to TensorFlow data format and/or Caffe data format through the ONNX, where the TensorFlow data format and/or Caffe data format is further converted into NMP-Supported format.

FIG. 8 describes an approach for finding the optimal NN model format by comparing the inference results using the same test set when the test set is inferred by the NN model in its original data format and the NN Model that is converted from a PyTorch data format to TensorFlow data format and/or Caffe data format through the ONNX, where the TensorFlow data format and/or Caffe data format is further converted into NMP-Supported format, as is shown in reference numeral 800.

In order to find the optimal 'NMP-convertible format,' another approach is attempted where the inference results using multiple NMP formats, which are produced from multiple NMP-convertible formats, respectively, are compared. This is because there may be cases where the inference results using the NMP-convertible formats might be different from the inference results of the NMP formats even after the NMP-convertible formats are converted to the NMP formats. Therefore, in this approach, the present disclosure may convert the 'non-NMP-convertible format' into several types of NMP-convertible formats and to the NMP formats, in turn. Next, inference results using each of the converted NMP formats may be compared among themselves for the same input data. Finally, the 'non-NMP-convertible format' that corresponds with the 'NMP format' that produces the least error may be selected as a format related to the optimal 'NMP-convertible format.'

The detailed steps of an example process are as follows:

1) Prepare NN model in raw format, which is one of 'non-NMP-convertible format' (e.g. PyTorch format 801).
2) Convert the NN model in Step 1 to NMP-convertible format by ONNX format 802.
3) Convert the ONNX model of Step2 to a first format 803 (e.g. TensorFlow format), which is one of 'NMP-convertible format' and convert it to 'a first format'-based NMP format using NMP-converter and mapper, as is shown in reference numeral 805.
4) Convert the ONNX model of Step2 into a second format 804 (e.g. Caffe format), one of the 'NMP-convertible formats' and convert it to 'a second format'-based NMP format using NMP-converter and mapper, as is shown in reference numeral 806.
5) With the same input data set, using the NN model of the raw format and the NN model of the 'a first format'-based NMP format (using NPU), get each inference result and calculate the mean squared error (according to embodiments, other error estimation functions may be applied) between the results, as is shown in reference numeral 807.
6) With the same input data set, using the NN model of the raw format and the NN model of the 'a second format'-based NMP format (using NPU), get each inference result and calculate the mean squared error (according to embodiments, other error estimation functions may be applied) between the results, as is shown in reference numeral 808.
7) Select the optimal 'NMP-convertible format' with less error among Step5 and Step6, as is shown in reference numeral 809.

As such, a format to be used for conversion may be determined by obtaining a result value in the NMP using the converted format and comparing the result value to a result value obtained using a general processor based on the format before the conversion such as PyTorch.

Figure 9:
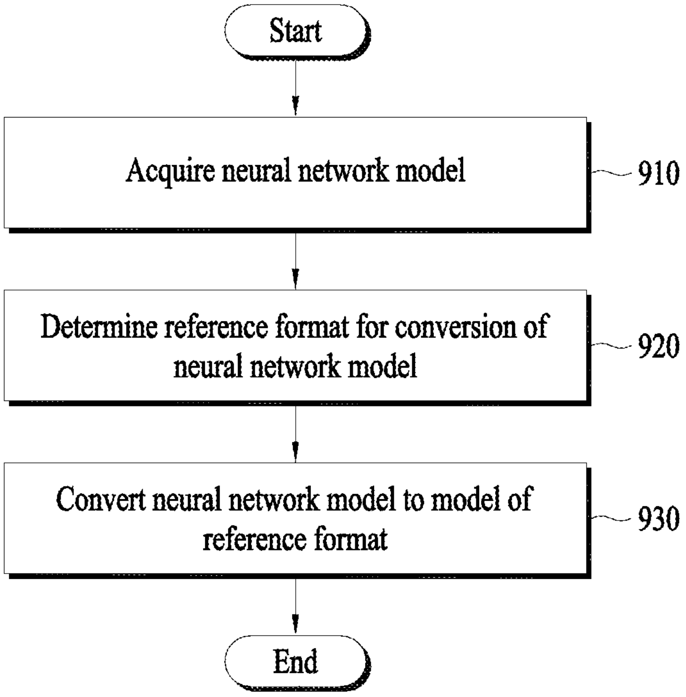
FIG. 9 is a flowchart illustrating a method of processing information in an electronic apparatus according to an example embodiment.

FIG. 9 is a flowchart illustrating a method of processing information in an electronic apparatus according to an example embodiment.

Referring to FIG. 9, in operation 910, an electronic apparatus that is an operating entity of the present disclosure according to an example embodiment acquires a neural network model. The acquired neural network model is to run on an NPU.

In operation 920, the electronic apparatus determines a reference format for conversion of the neural network model. The electronic apparatus may identify a format executable in the NPU (hereinafter, also referred to as an "NPU-executable format") to determine the reference format. Specifically, according to an example embodiment, the electronic apparatus may determine a neural network data format executable in the NPU to be the reference format. For example, the reference format according to an example embodiment may include an NMP format which is a neural network data format executable in an NMP hardware accelerator.

When a plurality of formats is executable in the NPU, the electronic apparatus may identify, for each of the plurality of formats, an inference result obtained in the NPU in a case in which the neural network model is converted using each format and determine a reference format based on the identified inference result.

Meanwhile, when the electronic apparatus converts the neural network model to a model of the reference format, even in terms of an operation of converting the neural network model into an intermediate format (which may include at least one of the above-described "NMP-convertible format" and the above-described "intermediate expression") and then converting the intermediate format to the reference format, the electronic apparatus may identify an inference result obtained in the NPU in a case in which the neural network model is converted using each format as the intermediate format for each of the plurality of formats. The example related to such operation has been described with reference to FIGS. 7 and 8.

In operation 930, the electronic apparatus converts the neural network model to a model of the reference format. The electronic apparatus according to an example embodiment may determine whether the neural network model is to be directly converted to the model of the reference format. When the neural network model is to be directly converted to the model of the reference format, the electronic apparatus may directly convert the neural network model to the model of the reference format. In contrast, when the neural network model is not to be directly converted to the model of the reference format, the electronic apparatus may convert the neural network model to a model of the intermediate format. For example, when the neural network model is to be directly converted to the model of the reference format, the electronic apparatus according to an example embodiment may perform the above-described 1-step conversion process. When the neural network model is to not be directly converted to the model of the reference format, the electronic apparatus may perform the above-described 2-step conversion process. The example related to such operation has been described with reference to FIG. 2.

In some cases, irrespective of whether the neural network model is to be directly converted to the model of the reference format, the electronic apparatus may convert the neural network model into the intermediate format and convert the model of the intermediate format to the model of the reference format. In such cases, even data that is directly convertible into the reference format may be additionally converted into the intermediate format, which may cause inefficiency in an operation. Instead, there may be advantages in that a logic of a process may be more concise and a structure of the neural network model may be verified in a form of the intermediate format. The example related to such operation has been described with reference to FIG. 3.

Meanwhile, the intermediate format may include a YAML format, and it is merely an example.

In addition, although the example of conversion to the reference format through the intermediate format has been described for ease of description, in some cases, the conversion to the reference format may be performed through a plurality of intermediate formats in sequence. For example, the neural network model may be converted into an intermediate format 1, a model of the intermediate format 1 may be converted to a model of an intermediate format 2, and the model of the intermediate format 2 may be converted into the reference format. Even in a case of the conversion performed sequentially through the plurality of intermediate formats, the overall description of the present disclosure may apply for understanding and interpretation.

When the NPU is designed not to support floating point data such as 32-bit floating point data, quantization may be performed to change (for example, to change a 32-bit floating point input value to a value represented in a 16-bit Q-format) a floating point input value to a value represented in a Q-format. Specifically, according to an example embodiment, when the neural network model includes the floating point data, the electronic apparatus may quantize at least a portion of data included in the neural network model based on a set Q-number. Such quantization operation may be performed in a process of converting the neural network model to the model of the reference format, but the present disclosure is not limited thereto. In addition, the neural network model including the floating point data may be interpreted as the meaning that at least a portion of parameters of each layer included in the neural network model includes the floating point data, but the present disclosure is not limited thereto.

The electronic apparatus according to an example embodiment may set a Q-number instead of using the set Q-number. For example, the electronic apparatus may determine, for each of a plurality of candidate Q-numbers, a precision of conversion obtained in a case of using each candidate Q-number, and based on a result of the determining, determine a Q-number to be used. For example, the electronic apparatus may compare NPU's output result errors for multiple Q-numbers and determine a Q-number having a least error (that is, highest precision) to be an optimal Q value.

In an example, the electronic apparatus may identify a mean squared error (MSE) of a case in which each candidate Q-number is used, thereby determining the precision.

According to an example embodiment, the electronic apparatus may acquire a test neural network model and identify a precision of conversion for the acquired test neural network model, thereby obtaining an optimal Q-number for quantization. For example, the electronic apparatus may acquire a "smaller" model compared to the neural network model acquired in operation 910 and use the acquired model for a test, thereby saving resources and time required for the test. Specifically, the electronic apparatus may acquire a test model satisfying at least one of a first condition of having a smaller number of nodes for each layer compared to the neural network model, a second condition of having a smaller weight for each node of a layer compared to the neural network model, and a third condition of having a smaller number of items of input and output data required for execution compared to the neural network model. In addition, a condition of having a smaller quantity of input data and the like may also be taken into consideration to acquire a model useful to the test in practice.

In some cases, instead of applying a single Q-value to the model acquired in operation 910, a plurality of Q-values may be applied, and this may include an example of classifying a plurality of layers included in the model into two or more groups and determining an optimal Q-number for each group (for example, a separate optimal Q-number may be determined for each layer). In such cases, a separate test model may be acquired for each group and the optimal Q-number for each group may be identified based on the acquired test models.

Meanwhile, depending on example embodiments, the electronic apparatus may determine the optimal Q-number using, for example, a method of considering an amount to which a memory space is to be saved, a volume to which a network is to be downsized (and an amount to which calculation and processing time are to be reduced), and the like in addition to the precision or a method of considering other various elements. For example, when Q1 is used, a higher precision may be obtained compared to a case in which Q2 is used. Even in this instance, if the memory space and the calculation time are significantly reduced in the case in which Q2 is used, Q2 may be determined to be the optimal Q-number.

The example related to the process of finding the optimal Q-number has been described with reference to FIG. 6.

The electronic apparatus may determine the quantity of input data for executing the model converted into the reference format in the NPU. According to an example embodiment, the electronic apparatus may determine a quantity of input data in consideration of a data processing performance of the NPU. For example, the electronic apparatus may determine a quantity of input data that reduces or minimizes the calculation iteration of the NPU.

Specifically, when a plurality of NPUs is used for executing the model converted into the reference format, the electronic apparatus may determine, for each of the plurality of NPUs, a number of items of data to be processed through one calculation, determine a number of items of input data allocated for each of the plurality of NPUs, identify an NPU in which a ratio of the number of items of allocated input data to the number of items of data to be processed is increased or maximized among the plurality of NPUs, and determine, for the identified NPU, a quantity of input data that reduces or minimizes a calculation iteration.

Meanwhile, in some cases, instead of calculating a ratio of the number of items of allocated input data to the number of items of data to be processed for each of the plurality of NPUs, the electronic apparatus may identify an NPU having the largest number of allocated input data among the plurality of NPUs and determine the quantity of input data that reduces or minimizes the calculation iteration for the corresponding NPU. For example, such method may be used to determine the quantity of input data when the NPUs have little or no difference in the number of items of data to be processed through one calculation.

The example related to the process of determining the quantity of input data has been described with reference to FIG. 5.

Figure 10:
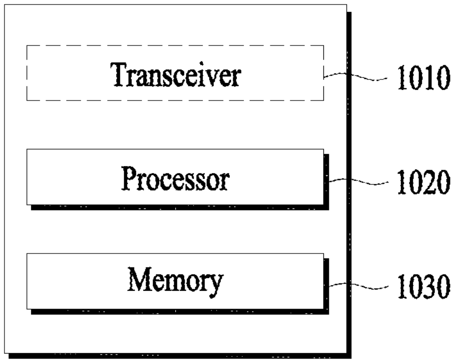
FIG. 10 is a diagram illustrating a configuration of an electronic apparatus for processing information according to an example embodiment.

FIG. 10 is a block diagram illustrating an electronic apparatus for acquiring area information according to an example embodiment.

Referring to FIG. 10, an electronic apparatus includes a processor 1020 and a memory 1030, and may further include a transceiver 1010 depending on an example embodiment. The electronic apparatus 110 may be connected to an external device and the like through the transceiver 1010 to perform data exchange.

The processor 1020 may include one or more apparatuses described with reference to FIGS. 1 through 9 or perform at least one of the methods described with reference to FIGS. 1 through 9. The memory 1030 may store information for performing at least one of the methods described with reference to FIGS. 1 through 9. The memory 1030 may be a volatile memory or a non-volatile memory.

The processor 1020 may execute a program and control an electronic apparatus for providing information. Code of the program executed by the processor 1020 may be stored in the memory 1030.

In addition, according to an example embodiment, the electronic apparatus may further include an interface for providing information to a user.

The present specification and drawings have been described with respect to the example embodiments of the present disclosure. Although specific terms are used, it is only used in a general sense to easily explain the technical content of the present disclosure and to help the understanding of the present disclosure, and is not intended to limit the scope of the specification. It will be apparent to those skilled in the art that other modifications based on the technical spirit of the present disclosure may be implemented in addition to the embodiments disclosed herein.

The electronic apparatus or terminal in accordance with the above-described embodiments may include a processor, a memory which stores and executes program data, a permanent storage such as a disk drive, a communication port for communication with an external device, and a user interface device such as a touch panel, a key, and a button. Methods realized by software modules or algorithms may be stored in a computer-readable recording medium as computer-readable codes or program commands which may be executed by the processor. Here, the computer-readable recording medium may be a magnetic storage medium (for example, a read-only memory (ROM), a random-access memory (RAM), a floppy disk, or a hard disk) or an optical reading medium (for example, a CD-ROM or a digital versatile disc (DVD)). The computer-readable recording medium may be dispersed to computer systems connected by a network so that computer-readable codes may be stored and executed in a dispersion manner. The medium may be read by a computer, may be stored in a memory, and may be executed by the processor.

The present embodiments may be represented by functional blocks and various processing steps. These functional blocks may be implemented by various numbers of hardware and/or software configurations that execute specific functions. For example, the present embodiments may adopt direct circuit configurations such as a memory, a processor, a logic circuit, and a look-up table that may execute various functions by control of one or more microprocessors or other control devices. Similarly to that elements may be executed by software programming or software elements, the present embodiments may be implemented by programming or scripting languages such as C, C++, Java, and assembler including various algorithms implemented by combinations of data structures, processes, routines, or of other programming configurations. Functional aspects may be implemented by algorithms executed by one or more processors. In addition, the present embodiments may adopt the related art for electronic environment setting, signal processing, and/or data processing, for example. The terms “mechanism”, “element”, “means”, and “configuration” may be widely used and are not limited to mechanical and physical components. These terms may include meaning of a series of routines of software in association with a processor, for example.

The above-described embodiments are merely examples and other embodiments may be implemented within the scope of the following claims.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method of processing information, the method comprising:

acquiring a neural network model;

determining a reference format for conversion of the neural network model;

converting the neural network model to a model of the reference format; and determining a size of input data segments for executing the model converted into the reference format in one or more neural processing units (NPUs), wherein for a plurality of NPUs, the determining of the size of input data segments comprises:

partitioning input data into a plurality of data segments of a first size, based on a first method considering a number of the plurality of NPUs;

determining, for each of the plurality of NPUs, a number of items of data to be processed through one calculation;

determining, for each of the plurality of NPUs, an amount of time required for performing the one calculation;

determining a number of the data segments of the first size allocated for each of the plurality of NPUs;

based on the number of items of data to be processed through one calculation, the amount of time required for performing the one calculation, and the number of the data segments of the first size, identifying an NPU that requires a maximum amount of time for processing the allocated data segments of the first size;

determining a second method for partitioning the input data; and executing, using the plurality of NPUs, the model converted into the reference format with the input data partitioned according to the second method by dividing at least one of a width dimension, a height dimension, and a channel dimension of the input data into a plurality of data segments of a second size that reduces, relative to the first size, a number of calculation iterations performed by the identified NPU and inference processing latency of the plurality of NPUs.

2. The method of claim 1, wherein when the neural network model includes floating point data, the converting of the neural network model to the model of the reference format comprises quantizing at least a portion of data included in the neural network model based on a set Q-number.

3. The method of claim 2, further comprising:

determining, for each of a plurality of candidate Q-numbers, a precision of the conversion of a case in which each candidate Q-number is used; and determining the Q-number based on a determination result of the precision.

4. The method of claim 3, wherein the determining of the precision of the conversion comprises identifying a mean squared error (MSE) of the case in which each candidate Q-number is used.

5. The method of claim 3, wherein the determining of the precision of the conversion comprises:

acquiring a test neural network model; and identifying a precision of the conversion for the test neural network model.

6. The method of claim 5, wherein the acquiring of the test neural network model comprises acquiring a model that satisfies at least one of:

a first condition of having a smaller number of nodes for each layer compared to the neural network model;

a second condition of having a smaller weight for each node of a layer compared to the neural network model; and a third condition of having a smaller number of items of input and output data for execution compared to the neural network model.

7. The method of claim 1, wherein the determining of the reference format comprises identifying a format executable in the NPU.

8. The method of claim 7, wherein when a plurality of formats is executable in the NPU, the method further comprises:

identifying, for each of the plurality of formats, an inference result obtained in the NPU in a case in which the neural network model is converted using each format; and determining the reference format based on the inference result.

9. The method of claim 1, wherein the converting of the neural network model comprises:

determining whether the neural network model is to be directly converted to the model of the reference format;

directly converting the neural network model to the model of the reference format when the neural network model is to be directly converted to the model of the reference format; and converting the neural network model to a model of an intermediate format when the neural network model is not to be directly converted to the model of the reference format.

10. The method of claim 9, wherein the intermediate format comprises a YAML format.

11. A non-transitory computer-readable recording medium having contents which cause an electronic apparatus to perform a method comprising:

acquiring a neural network model;

determining a reference format for conversion of the neural network model;

converting the neural network model to a model of the reference format; and determining a size of input data segments for executing the model converted into the reference format in one or more neural processing units (NPUs), wherein for a plurality of NPUs, the determining of the size of input data segments comprises:

partitioning input data into a plurality of data segments of a first size, based on a first method considering a number of the plurality of NPUs;

determining, for each of the plurality of NPUs, a number of items of data to be processed through one calculation;

determining, for each of the plurality of NPUs, an amount of time required for performing the one calculation;

determining a number of the data segments of the first size allocated for each of the plurality of NPUs;

based on the number of items of data to be processed through one calculation, the amount of time required for performing the one calculation, and the number of the data segments of the first size, identifying an NPU that requires a maximum amount of time for processing the allocated data segments of the first size;

determining a second method for partitioning the input data; and executing, using the plurality of NPUs, the model converted into the reference format with the input data partitioned according to the second method by dividing at least one of a width dimension, a height dimension, and a channel dimension of the input data into a plurality of data segments of a second size that reduces, relative to the first size, a number of calculation iterations performed by the identified NPU and inference processing latency of the plurality of NPUs.

12. The non-transitory computer-readable recording medium of claim 11, wherein when the neural network model includes floating point data, the converting of the neural network model to the model of the reference format comprises quantizing at least a portion of data included in the neural network model based on a set Q-number, wherein the method further comprises:

determining, for each of a plurality of candidate Q-numbers, a precision of the conversion of a case in which each candidate Q-number is used; and determining the Q-number based on a determination result of the precision.

13. The non-transitory computer-readable recording medium of claim 12, wherein the determining of the precision of the conversion comprises:

acquiring a test neural network model; and identifying a precision of the conversion for the test neural network model.

14. The non-transitory computer-readable recording medium of claim 13, wherein the acquiring of the test neural network model comprises acquiring a model that satisfies at least one of:

a first condition of having a smaller number of nodes for each layer compared to the neural network model;

a second condition of having a smaller weight for each node of a layer compared to the neural network model; and a third condition of having a smaller number of items of input and output data for execution compared to the neural network model.

15. An electronic apparatus for processing information, the electronic apparatus comprising:

at least one memory in which one or more instructions are stored; and at least one processor, wherein the at least one processor is electrically connected to the at least one memory and configured to:

acquire a neural network model;

determine a reference format for conversion of the neural network model;

convert the neural network model to a model of the reference format; and determine a size of input data segments for executing the model converted into the reference format in one or more neural processing units (NPUs), wherein for a plurality of NPUs, the at least one processor is configured to determine the size of input data segments by:

partitioning input data into a plurality of data segments of a first size, based on a first method considering a number of the plurality of NPUs;

determining, for each of the plurality of NPUs, a number of items of data to be processed through one calculation;

determining, for each of the plurality of NPUs, an amount of time required for performing the one calculation;

determining a number of the data segments of the first size allocated for each of the plurality of NPUs;

based on the number of items of data to be processed through one calculation, the amount of time required for performing the one calculation, and the number of the data segments of the first size, identifying an NPU that requires a maximum amount of time for processing the allocated data segments of the first size; and determining a second method for partitioning the input data; and executing, using the plurality of NPUs, the model converted into the reference format with the input data partitioned according to the second method by dividing at least one of a width dimension, a height dimension, and a channel dimension of the input data into a plurality of data segments of a second size that reduces, relative to the first size, a number of calculation iterations performed by the identified NPU and inference processing latency of the plurality of NPUs.

16. The electronic apparatus of claim 15, wherein when the neural network model includes floating point data, the converting of the neural network model to the model of the reference format comprises quantizing at least a portion of data included in the neural network model based on a set Q-number.

17. The electronic apparatus of claim 16, where the at least one processor is further configured to:

determine, for each of a plurality of candidate Q-numbers, a precision of the conversion of a case in which each candidate Q-number is used; and determine the Q-number based on a determination result of the precision.

18. The electronic apparatus of claim 17, wherein the determining of the precision of the conversion comprises identifying a mean squared error (MSE) of the case in which each candidate Q-number is used.

19. The electronic apparatus of claim 17, wherein the determining of the precision of the conversion comprises:

acquiring a test neural network model; and identifying a precision of the conversion for the test neural network model.

20. The electronic apparatus of claim 19, wherein the acquiring of the test neural network model comprises acquiring a model that satisfies at least one of:

a first condition of having a smaller number of nodes for each layer compared to the neural network model;

a second condition of having a smaller weight for each node of a layer compared to the neural network model; and a third condition of having a smaller number of items of input and output data for execution compared to the neural network model.

* * * * *